Jan. 10, 1933.　　　J. M. BRYAN ET AL　　　1,894,082
SELF LUBRICATING BEARING
Filed Feb. 9, 1931　　　3 Sheets-Sheet 1
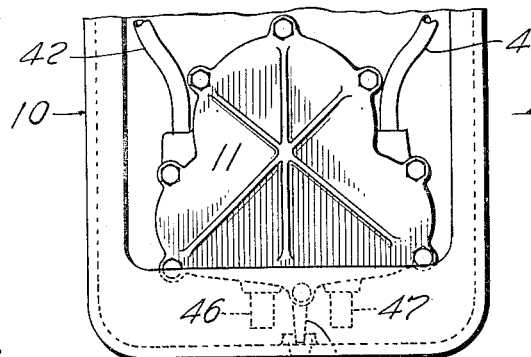
Fig. 1.
Fig. 2.
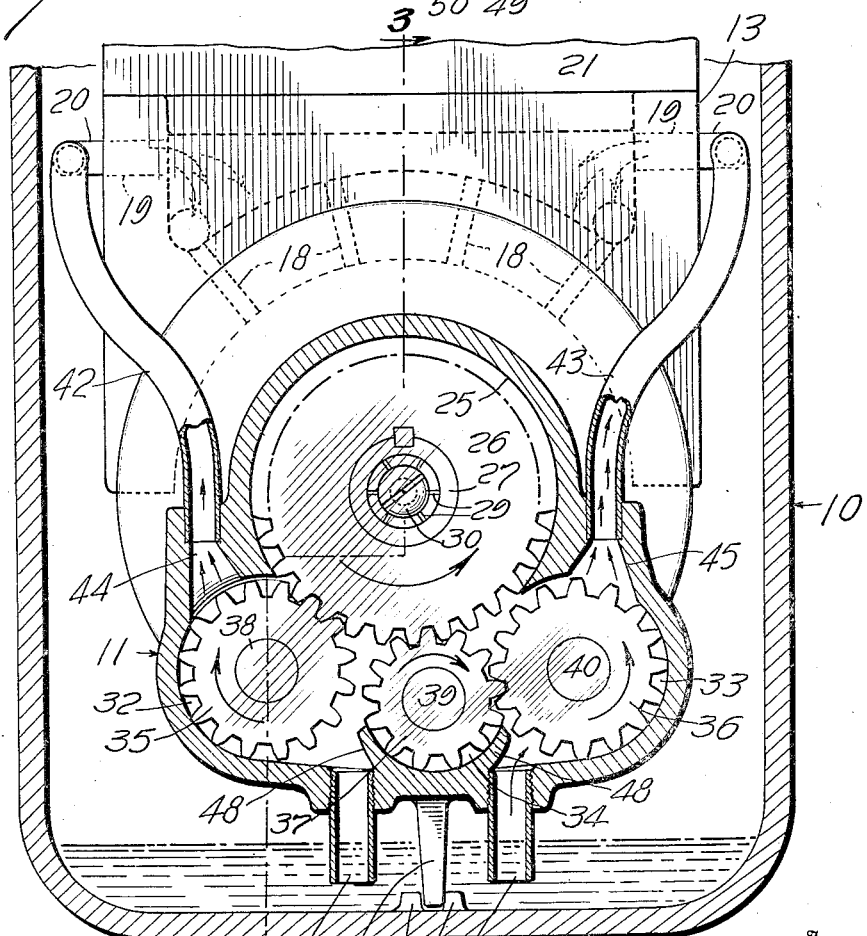
Inventors
JOSEPH M. BRYAN,
BRINAY SMARTT,
By
*[signature]* Attorney

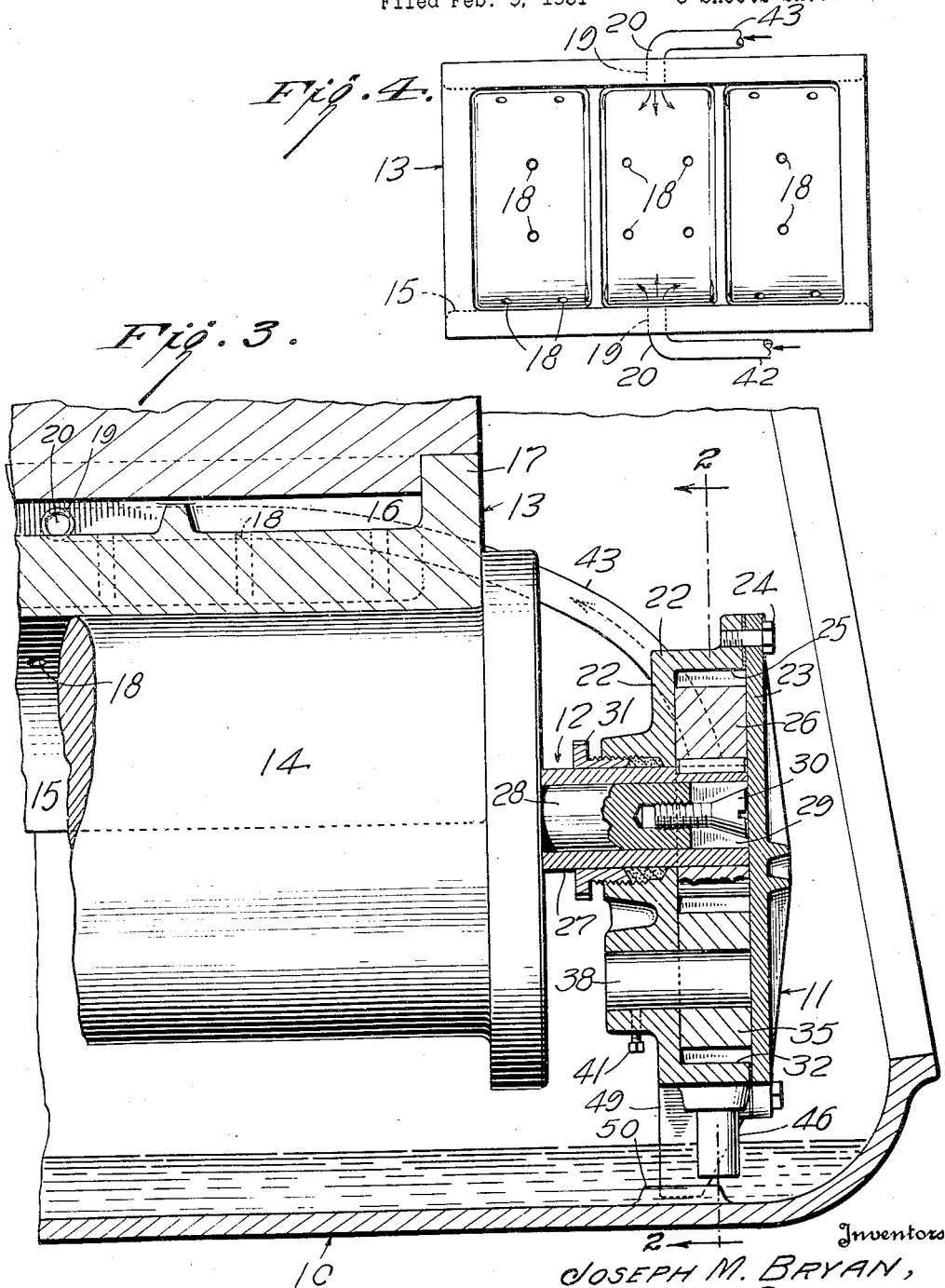

Inventors
JOSEPH M. BRYAN,
BRINAY SMARTT,

Patented Jan. 10, 1933

1,894,082

UNITED STATES PATENT OFFICE

JOSEPH M. BRYAN AND BRIMAY SMARTT, OF INDIANAPOLIS, INDIANA;
SAID SMARTT ASSIGNOR TO SAID BRYAN

SELF-LUBRICATING BEARING

Application filed February 9, 1931. Serial No. 514,641.

Our invention relates to self-lubricating bearings and has for one of its principal objects the provision of an extremely simple and highly effective device which may be either readily built in to existing journal-boxes or may be in the form of an attachment, as desired.

A further object of our invention is to provide a relatively small enclosed pump which will continuously force the circulation of oil or other lubricant from the oil receptacle in the lower side of the journal-box to the upper or bearing portion thereof.

A still further object of our invention resides in the provision of a novel arrangement of gearing which will compel the circulation of oil to the bearing in either direction of movement of the shaft member.

These and other objects of our invention will be apparent from the description and claim when taken in connection with the accompanying drawings forming a part of this application, wherein Figure 1 is a front elevation, partially broken away, of a journal-box generally used in connection with railway cars or the like;

Figure 2 is a transverse sectional view on an enlarged scale, taken on the line 2—2 of Figure 3 and looking in the direction of the arrows;

Figure 3 is a longitudinal sectional view taken along the line 3—3 of Figure 2 and looking in the direction indicated by the arrows;

Figure 4 is a top plan view of the bearing used in conjunction with this type of journal-box;

Figure 5:
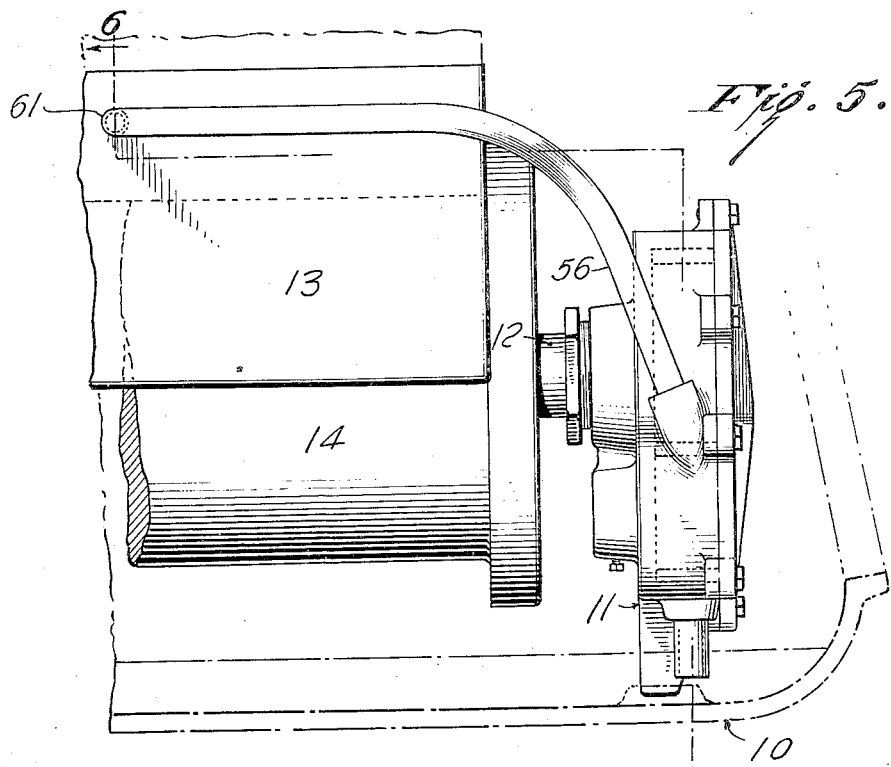
Figure 5 is a fragmentary side elevation of another form of the invention, portions of the journal-box shown in dotted lines.

Our invention, in the form or embodiment shown in the drawings and briefly described, comprises a main or outer casing, 10, an oil pump, 11, supported against rotative movement within the main casing, 10, and driving means indicated generally as at 12, for rotating the gears within the gear casing, compelling the circulation of the lubricating oil through the bearing, 13. In the present embodiments of our invention we have disclosed a self-lubricating journal box for railway cars or the like, but it may be here stated that our invention may be readily employed in connection with numerous other types of journal-boxes for movable shafts.

With particular reference to Figures 1, 2, 3 and 4 of the accompanying drawings wherein is illustrated a journal-box wherein the shaft is adapted to be rotated in one direction, the main casing, 10, preferably surrounds or houses the rotatably mounted shaft, 14. In this instance, the bearing, 13, is provided with a semi-circular depression, 15, which is adapted to rest upon the upper surface of the shaft, 14, and is further provided with a well or recess, 16, on its upper end. This well or depression, 16, is formed by the upstanding side walls or ribs, 17, for the purpose of receiving the oil, whereby the rotatable shaft may be effectually lubricated. A plurality of radially extending openings, 18, are provided in the upper portions of the bearing, 13, which, of course, connect the bearing surface of the member, 13, with the well or depression, 16. A pair of oppositely disposed and horizontally extending openings, 19, are provided in the side walls or flanges, 13, for the reception of the ends of the tubes, 20, for a purpose to be hereinafter described. A cover plate, 21, is preferably snugly fitted upon the upper surface of the bearing member, 13, and is adapted to rest upon the flanges, 17, thereby rendering the oil chamber, 16, dustproof.

The oil pump, indicated generally at 11, comprises a gear casing, 22, and a casing cover, 23, which may be secured thereto by means of bolts, 24, or other suitable fastening means. Referring now particularly to Figures 2 and 3, the gear casing, 22, is provided with a substantially circular depression, 25, for the reception of the master gear, 26, which, in turn, is keyed to the tubular shaft, 27. This tubular shaft, 27, is adapted to be snugly fitted upon the stub shaft, 28, which is, in turn, concentrically secured to the shaft, 14. For the purpose of readily attaching or disconnecting the tubular shaft, 27, with respect to the stub shaft, 28, we may provide the outer end of the stub shaft, 28, with a plurality of radially extending slits, 29, and a screw, 30, having a tapered head threaded in the stub shaft, for the purpose of expanding the end thereof against the adjacent portion of the tubular shaft, 27. By this means, it will be readily appreciated that we may easily disconnect the oil pump with respect to the stub shaft, 28, by merely removing the gear casing cover, 23, and then loosening the tapered screw, 30. A packing gland, 31, may be mounted in the rear wall of the gear casing, 22, if desired.

The gear casing, 22, is further provided with depressions, 32, 33, and 34, for the reception of the rotatably mounted gears, 35, 36 and 37. The depressions, 32 and 33, are suitably spaced apart to permit the rotation of the centrally disposed gear or pinion, 37, independently of the gear, 35. In this instance, it will be noted that the pinion, 37, merely acts as an idler through which the gear, 36, is driven. Then, too, in this manner, we obtain reverse directions of rotation of the gears, 35 and 36. The gears, 35, 36 and 37, may be mounted upon their respective shafts, 38, 39 and 40, which are, in turn, suitably supported by the rear wall of the gear casing, 22, and held in their proper position by means of set screws, 41.

A pair of pipes or tubes, 42 and 43, communicate with the recesses, 32 and 33, by means of the upwardly converging openings, 44 and 45, as is clearly indicated in Figure 2 of the accompanying drawings. These pipes, 42 and 43, may be secured within their respective openings in the gear casing as by soldering, brazing or the like. A pair of threaded openings are provided in the lower portions of the gear casing, 22, in close proximity of the gears, 35 and 36, for the reception of the short pipes or nipples, 46 and 47. The lower ends of these pipes or nipples, it will be noted, extend downwardly into the main casing, 10, below the oil level and to within a relatively short distance of the bottom of the main outer casing. In this manner, the journal bearing will be effectually lubricated with a comparatively small amount of oil in the oil well or chamber. By referring again to Figure 2, it will be noted that the depression, 34, in which the lower portion of the idler gear, 37, rotates, is arcuate and the sides thereof indicated at 48, extend downwardly and merge into the bottom of the gear casing, 22. The purpose of this arcuate depression, or rather, the side walls, 48, is to prevent the oil which flows upwardly through the pipes, 46 and 47, from coming in contact with the idler gear, 37, and to assure the oil to be conveyed in the direction of the arrows indicated by the gears, 35 and 36, from which it will be forced upwardly through their respective tubes from pipes, 42 and 43, and into the oil chamber, 16, through the outlet ends of the tubes or pipes, 20.

Although the oil pump, 11, is held concentrically with respect to the shaft, 14, and further held against rotation by means of the pipes, 42, and 43, we have provided an additional means for preventing any rotative movement of the oil pump with respect to the rotatable shaft. This means comprises a downwardly extending arm or lug, 49, which is preferably formed integral with the lower portion of the gear casing, 22, and a pair of oppositely disposed and upwardly extending lugs, 50, which are integrally cast with the outer casing, 10.

Figure 6:
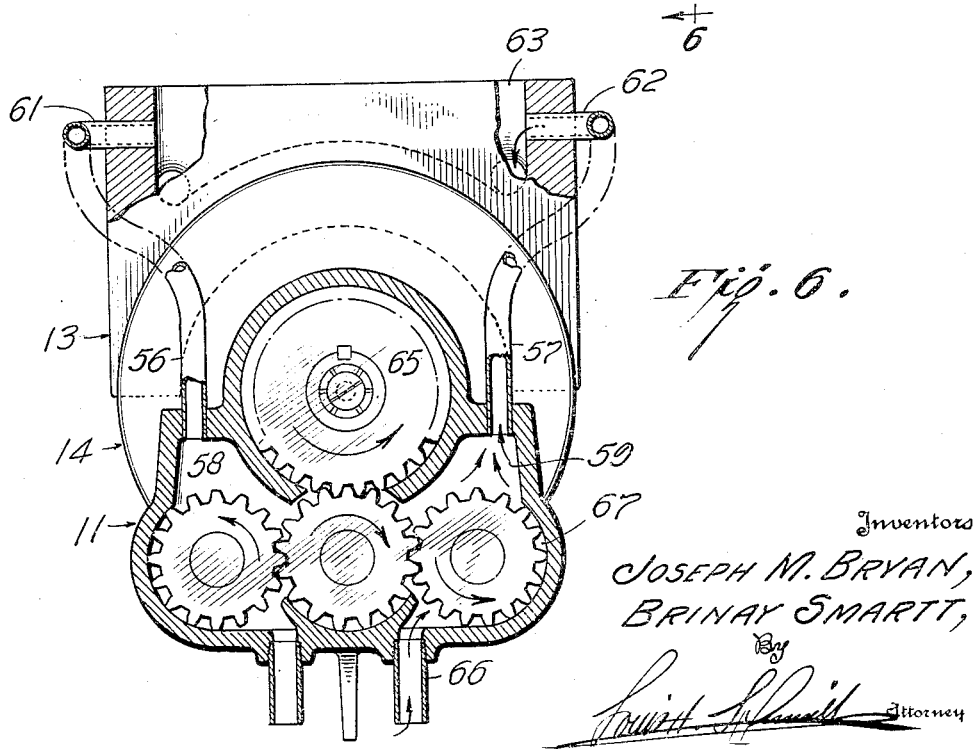
Figure 6 is a transverse sectional view thereof taken on the line 6—6 of Figure 5.

In the embodiment of our invention illustrated in Figures 5 and 6, wherein is disclosed an oil pump for forcibly lubricating a bearing regardless of the direction in which the shaft rotates, a novel arrangement of gearing is shown.

Referring particularly to Figure 6, it will be noted that the lower ends of the oil feed branches, 56 and 57, communicate with the depressions or chambers, 58 and 59, whereas the upper end of these pipes are provided with transversely extending pipe sections, 61 and 62, which terminate in the oil chamber, 63.

The rotation of the master gear, 65, as indicated in Figure 6, of the drawings, will cause the oil to circulate in the direction shown by the arrows, entering through the pipe or nipple, 66, then forced around the depression, 67, and upwardly through the chamber, 59, into the pipe, 57.

Obviously, when the master gear, 65, rotates in the opposite direction or clockwise, the oil will flow upwardly through the opposite short pipe or nipple, through the depression, 58, thence into the pipe and its respective transverse pipe section, 56, and 61, into the oil chamber 63.

It will now be readily understood that the journal box or bearing may be utilized in connection with a movable shaft for constantly lubricating it under pressure and regardless of the direction of movement of its respective shaft.

It may be here stated that the several units comprising our invention may be readily installed, and its efficiency maintained with the minimum amount of care and attention.

What we claim is:

In a lubricating apparatus for a bearing, the combination comprising a main shaft and a stub shaft secured thereto, said stub shaft being radially slotted at its extremity and internally threaded and tapered, a sleeve secured upon said stub shaft, a pump mounted upon said sleeve and removably secured thereto by a screw with a tapered head which engages the threaded and tapered portions of said stub shaft and expands the slotted portions thereof against said sleeve, said pump having a housing and a cover-plate therefor, said cover-plate abutting against the end of said stub shaft to prevent loosening of said screw.

In witness whereof we have signed this specification.

JOSEPH M. BRYAN.
BRINAY SMARTT.